Oct. 21, 1930.  LEROY S. PFOUTS  1,779,330
FREEZING MECHANISM
Filed June 2, 1926  5 Sheets-Sheet 1

Inventor
Leroy S. Pfouts
By
Attorney

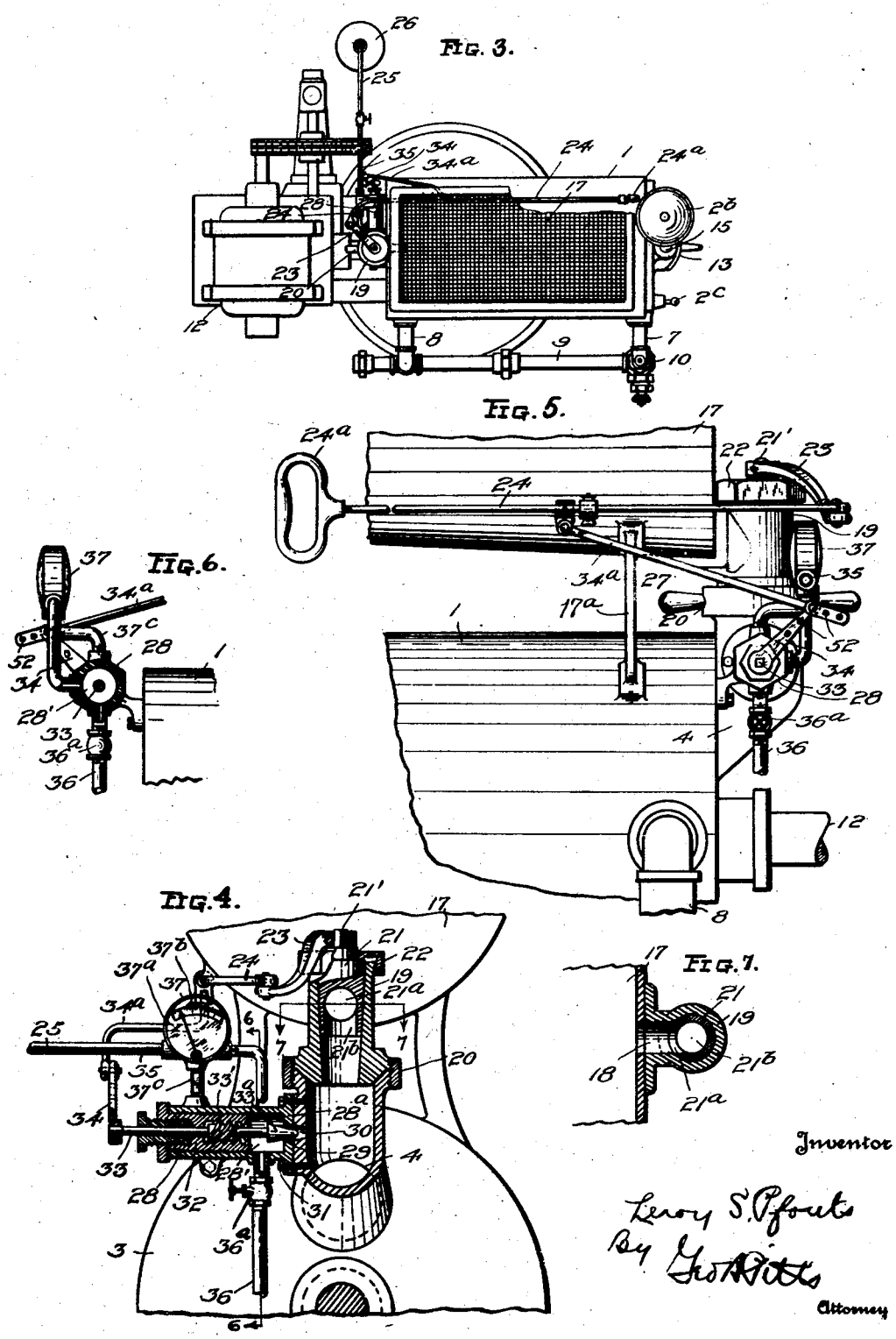

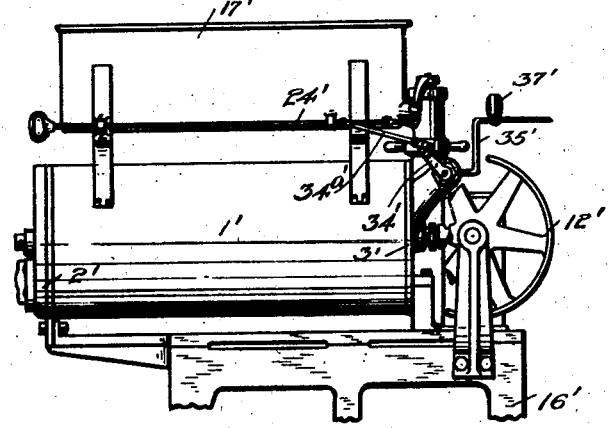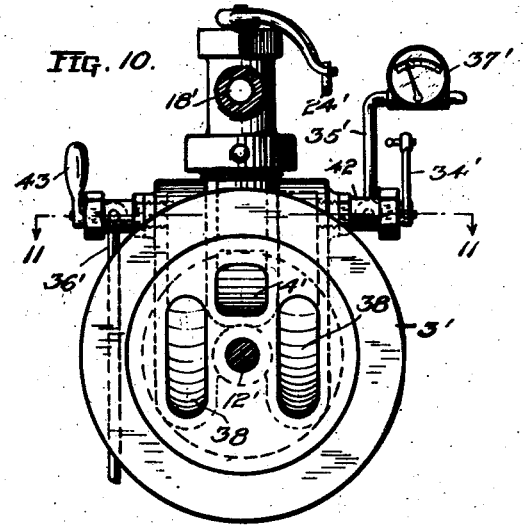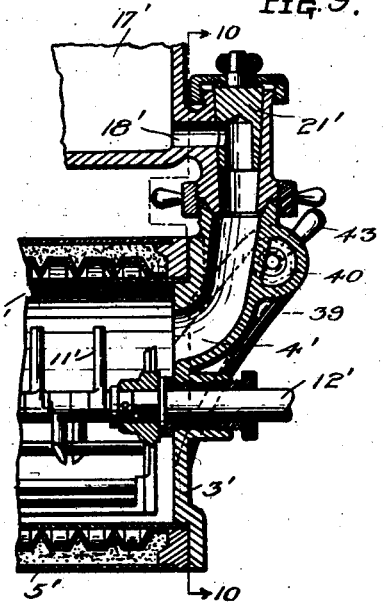

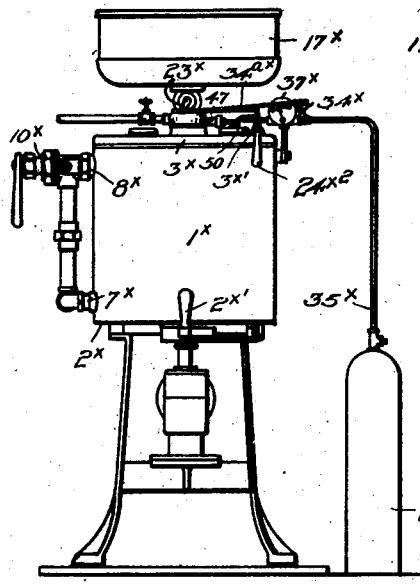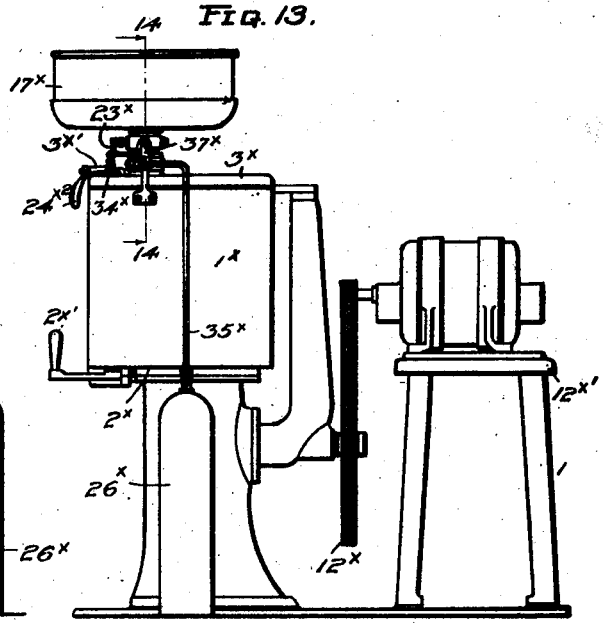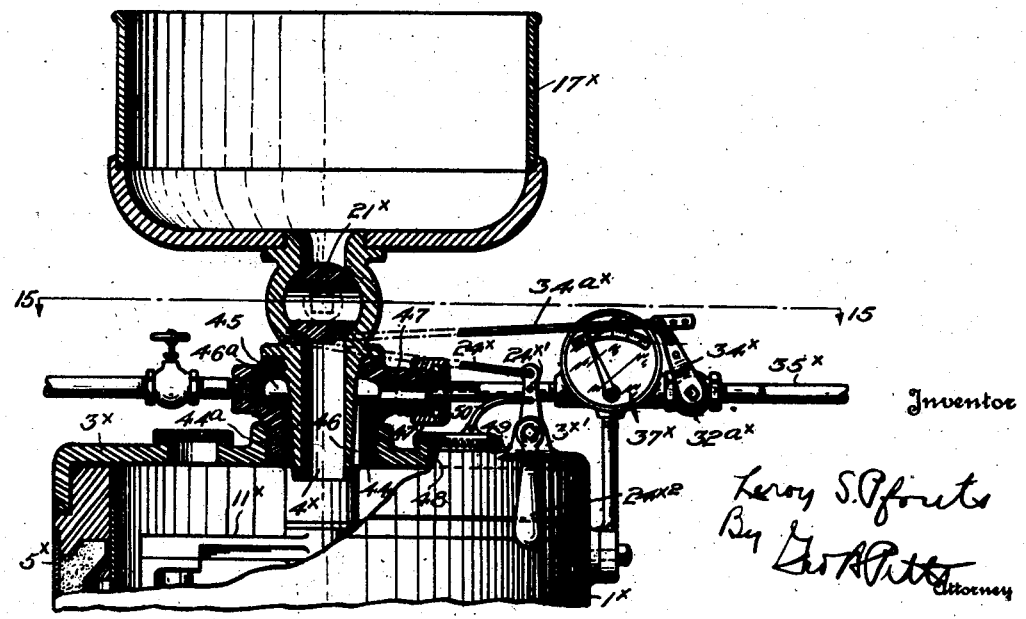

Oct. 21, 1930.  LEROY S. PFOUTS  1,779,330
FREEZING MECHANISM
Filed June 2, 1926   5 Sheets-Sheet 5

Inventor
Leroy S. Pfouts
By
Attorney

Patented Oct. 21, 1930

1,779,330

UNITED STATES PATENT OFFICE

LEROY S. PFOUTS, OF CANTON, OHIO; JOAN S. PFOUTS ADMINISTRATRIX OF SAID LEROY S. PFOUTS, DECEASED

FREEZING MECHANISM

Application filed June 2, 1926. Serial No. 113,178.

This invention relates to a freezing mechanism and process of freezing materials wherein provision is made for charging the materials with a suitable gas to improve the resulting product.

One object of the invention is to provide in a freezing mechanism a supply for the material to be frozen and a supply for the gas and to connect the valves therefor in such manner that both are simultaneously operated to admit the material and gas or to shut off their flow.

Another object of the invention is to provide in mechanism of this character means for measuring and controlling the supply of the gas, whereby a predetermined quantity may be admitted as desired.

A further object of the invention is to provide a mechanism wherein the material to be frozen is charged with gas of relatively simple construction, whereby the operations of freezing a plurality of batches either in a single mechanism or in a plurality of such mechanisms may be carried on expeditiously and without extra labor or time.

A further object of the invention is to provide a freezing mechanism in which the food materials and a gas may be simultaneously introduced into the freezing chamber at will without stopping the agitating mechanism.

Another object of the invention is to provide an improved process of freezing food materials wherein the materials and a suitable gas are mixed at a time and in a manner which insures complete mixing without waste of time or extra labor.

Other objects of the invention will be apparent to those skilled in the art to which my invention relates from the following description taken in connection with the accompanying drawings, wherein Fig. 1 is a side view of a freezing mechanism embodying my invention, parts being broken away to facilitate the illustration.

Fig. 3 is a top plan view of the parts shown in Fig. 1.

Fig. 4 is a section on the line 4—4 of Fig. 1.

Fig. 5 is a side view of the parts shown in Fig. 4 looking toward the right.

Fig. 6 is a section on the line 6—6 of Fig. 4.

Fig. 7 is a section on the line 7—7 of Fig. 4.

Fig. 8 is a partial side elevation of a freezing mechanism embodying my invention, but showing a modified form of construction.

Fig. 9 is a fragmentary sectional view of parts shown in Fig. 8.

Fig. 10 is a section on the line 10—10 of Fig. 9.

Fig. 11 is a section on the line 11—11 of Fig. 10.

Fig. 12 is a front elevation of a freezing mechanism embodying my invention, but showing a further modified form of construction wherein the invention is embodied or incorporated in an upright type of freezing cylinder; this form of construction also showing a further novel feature in which provision is made for operating an air outlet valve simultaneously with the valves for the material to be frozen and the gas.

Fig. 13 is a side elevation of the parts shown in Fig. 12 looking toward the left.

Fig. 14 is a fragmentary section on the line 14—14 of Fig. 13.

Figure 1:
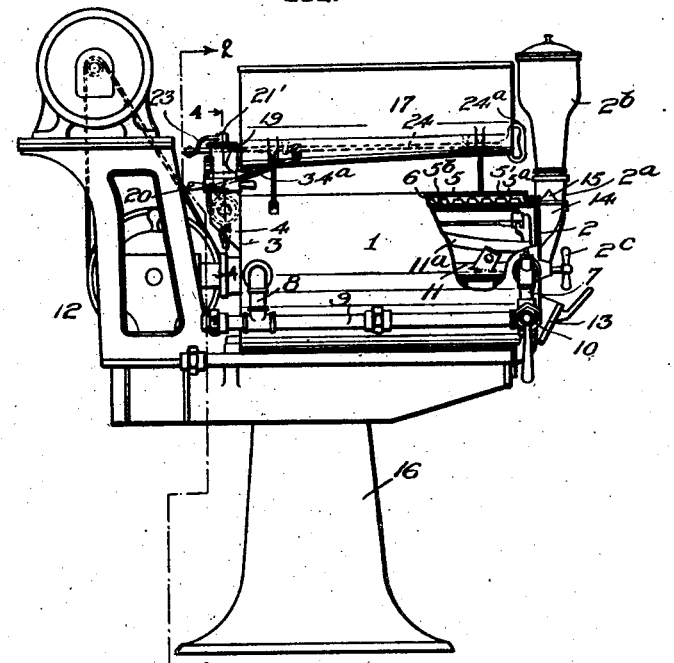
Figure 2:
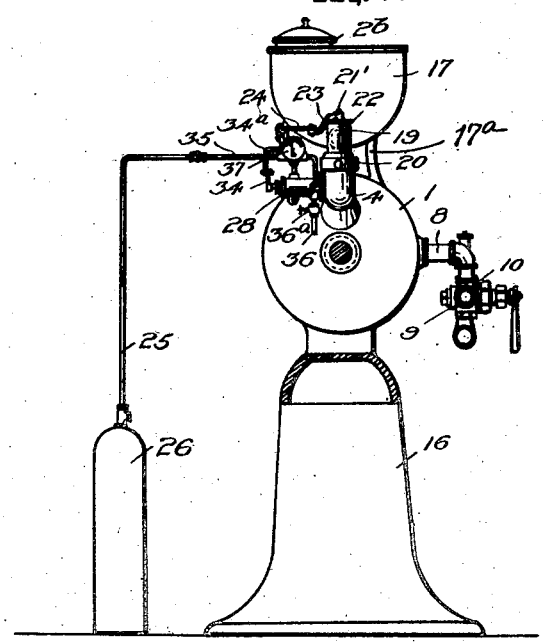
Fig. 2 is a section on the line 2—2 of Fig. 1.
Figure 15:
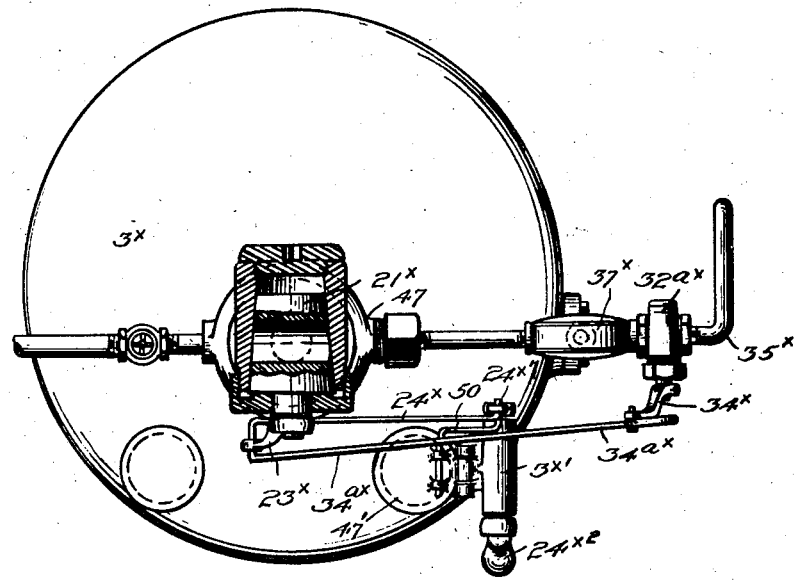

Fig. 15 is a section on the line 15—15 of Fig. 14.

Figure 16:
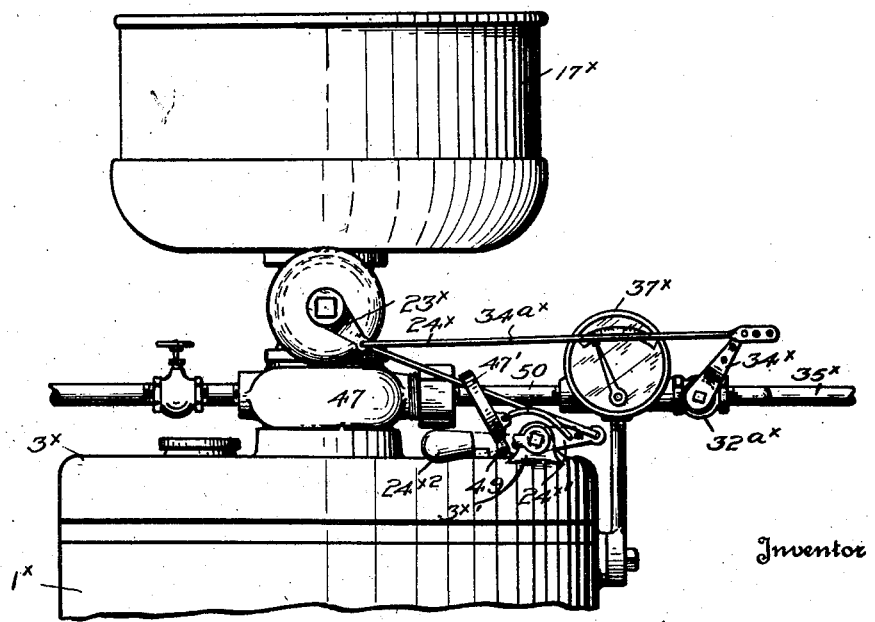

Fig. 16 is a fragmentary view of parts shown in Fig. 12, slightly enlarged and showing the valves for the material, gas and air in open position.

While my mechanism may be employed for freezing various kinds of materials it is particularly useful for freezing or making ice cream or similar products wherein milk or cream or both, or products produced therefrom, are used, in whole or in part.

The gas employed by me for charging the material to be frozen is preferably carbon dioxide ($CO_2$). The properties thereof for destroying or killing certain forms of bacteria in the material, for protecting the vitamins, for increasing the swell incident to freezing, preventing loss or shortage due to dispensing of the frozen product and purification of the product by the exclusion of air or substitution of the gas for the air whipped into the material during freezing are all well known characteristics. My invention has to do with the control of the material and the gas and the measuring of the latter whereby (1) definite proportions of gas may be admitted to the freezing cylinder; (2) both may be supplied in a manner that eliminates extra labor or time on the part of the operative; (3) uniform quality of material results; and (4) charging of the material with the gas at a time and in a manner which insures complete mixing thereof, in predetermined proportions, and without the injection of air into the material, with the result that the mechanism continues in operation for the freezing of successive batches of frozen material, the latter is completely impregnated with the gas and is so commingled with the material that all air is eliminated therefrom and effects the desired swell and no loss of time results or extra labor required in carrying out the successive freezing operations.

In the drawings, 1 indicates a freezing cylinder having a front head 2 and a rear head 3, one thereof (preferably the latter) being provided with an inlet 4, these parts forming a chamber for the materials and gas. 5 indicates a refrigerating means surrounding the cylinder 1. These means may comprise a helical passage 6 formed by a corrugated sheet of material extending from end to end of the cylinder 1, one end of the passage being connected with a supply pipe 7 for brine or other suitable refrigerant and its opposite end being connected by a discharge pipe 8. These pipes are connected by a return pipe 9, the control of the brine flow through the pipe 7 into the passage 6 or into the pipe 9 being controlled by a suitable valve 10. The refrigerating means is enclosed by a jacket 5′ preferably comprising suitable insulation 5ª and a cylinder 5ᵇ. 11 indicates a suitable agitating mechanism within the cylinder 1, preferably comprising oppositely rotatable members driven by the mechanism indicated at 12. Where the cylinder is disposed horizontally, such mechanism preferably includes one or more ejecting devices 11ª. The agitating and ejecting mechanism if desired, may be constructed according to the construction disclosed in Letters Patent No. 945,570 to John C. Miller or as disclosed in the application filed by William H. Thompson, on the 17th day of March, 1924, Ser. No. 699,849 (see Letters Patent No. 1,692,964). 13 indicates a gate or valve controlling an opening for the discharge of the frozen material. 14 indicates a duct leading through the front head 2 into the cylinder 1, its upper end being closed by a cap 15. The duct 14 permits the escape of air when the material and gas are admitted to the cylinder 1 or inspection of the material during its freezing. The cylinder 1 and its refrigerating means 5 and the driving mechanism 12 are mounted on a suitable support 16.

2ª indicates a material inlet preferably leading through the front head 2 into the cylinder 1, the upper end of the inlet supporting a funnel 2ᵇ. The inlet 2ª provides for the introduction of flavoring material, such as crushed fruit. The front head 2 and the inlet 2ª are preferably constructed according to the disclosure in Letters Patent No. 1,449,623 granted March 27, 1923. 2ᶜ indicates devices for removably connecting the head 2 in operative relation to the front end of the cylinder 1. 17 indicates a batch tank preferably mounted on the cylinder 5ᵇ, being supported thereon by legs 17ª. The tank 17 is provided with an outlet 18, connected to a casing 19, and the lower end of the latter is connected to the upper end of the inlet 4, by a coupling 20. As will be understood from Figs. 4, 5 and 7, the outlet 18, casing 19 and inlet 4 form a fluid connection or conduit from the tank 17 to the cylinder 1. The inner wall of the casing 19 forms a seat for a rotary plug 21 which is formed with connected ducts 21ª, 21ᵇ, so that the latter in one position of the plug 21 (see Figs. 4 and 7) may register with the outlet 18 to permit flow of the material from the tank 17 to the cylinder and in another position such flow will cut off. The plug 21 is held to its seat by a collar 22 screw threaded on the upper end of the casing 19. At its upper end the plug 21 carries an irregular shaped boss 21′ on which is mounted a crank arm 23. To the outer end of the crank arm 23 is pivotally connected a link 24 extending to a point adjacent the front head 2 and terminating in a handle 24ª, whereby the plug 21 may be oscillated to the positions already referred to.

25 indicates as an entirety a conduit for gas leading from a source of supply 26 to the cylinder 1 preferably at a point adjacent the inlet for the material, whereby the gas and material may become mixed as the latter flows into the cylinder 1 and insure the displacement of air therein and complete mixing of the material and gas together. The conduit 25 is controlled by a valve to which reference will later be made and such valve is connected by a connection 27 with an element (preferably the link 24) connected to the plug 21, so that both the inlet valve for the material and the gas inlet valve, to be later referred to, may be operated together for the purposes already set forth. In the form of construction now being referred to (Figs. 1 to 7 inclusive), 28 indicates a casing having an end wall 28ª formed with a port 29. The port 29 registers with a port 30 formed in one side wall of the inlet 4. The wall 28ᵃ is flanged and this flange is secured by suitable cap screws 31 to the side wall of the inlet. At one side the casing 28 may be provided with a bracket which is secured to the head 3 (see Figs. 4 and 5). The outer end of the casing 28 is open and receives a hollow plug 32, the inner end of which terminates in spaced relation to the wall 28ᵃ to form a chamber 28′. The plug 32 may have screw threaded connection with the inner wall of the casing 28 to permit its ready assembly and removal. 33 indicates a rod extending through the hollow plug 32 and carrying at its inner end a valve element 33ᵃ adapted to engage the wall of one of the ports 29, 30, or both walls thereof, to close the opening therethrough. The valve element 33ᵃ is preferably of conical shape and the walls of the ports 29, 30, are ground to form a suitable seat for the valve. The valve element 33ᵃ is moved axially of the axis of its seat to effect opening and closing of the ports 29, 30, for which purpose a portion of the rod 33, or a sleeve 33′ thereon, is provided with a thread of relatively long pitch which co-acts with a similarly pitched thread on a portion of the inner wall of the hollow plug 32, so that when the rod 33 is rotated a short distance the valve element 33ᵃ will be moved toward or from its seat according to the direction of rotation. At its outer end the rod 33 has fixed to it a crank arm 34 and the latter in turn is pivotally connected to one end of a link 34ᵃ the opposite end of which is adjustably and pivotally connected to the arm 24, whereby the operation of the latter endwise will not only operate the plug 21, as already described, but also rotate the rod 33; the crank arm 34 and link 34ᵃ constituting the connection 27 already referred to. As shown, the pipe 25 leading from the source of supply 26 to the chamber 28′ is connected to the wall of the casing 28, between the wall 28ᵃ and inner end of the plug 32, in any suitable manner (see Figs. 3 and 5). 36 indicates a separate pipe leading into the chamber 28′ and forming a suitable source of supply for a cleaning medium, such as water, steam or washing solution, whereby (when the gas is cut off, as by a suitable valve associated with the outlet nipple on the tank 26) the cleaning medium may be admitted to the chamber 28′, valve 33ᵃ, ports 29, 30, and inlet 4 to thoroughly wash the same. The pipe 36 is controlled by a valve 36ᵃ.

The batch tank 17 serves as a measuring device for the food materials to be frozen, it (a) being capable of holding a predetermined quantity of the mix to be frozen dependent of the capacity of the freezing chamber; or (b) being provided with a gage to indicate the amount placed therein; or (c) having associated with it a weighing mechanism or level controlling means to cut off the supply of the mix from a suitable source of supply. Accordingly, in either of these arrangements or constructions, when the plug 21 is operated to the position shown in Fig. 4, to effect emptying of the batch tank, a predetermined quantity of material will flow into the freezing chamber. However, it will be obvious that this operation may be effected in any other desired manner.

37 indicates as an entirety means for measuring the amount of gas delivered to the freezing chamber, whereby a predetermined amount, in proportion to the amount of mix delivered thereto can be accurately and positively determined and also admitted with the mix, as already set forth. The measuring means 37 preferably comprises a meter which measures or indicates the flow of the gas through the pipe 25. In the form of construction shown the operated element of the meter carries a hand 37ᵃ that moves relative to graduations 37ᵇ, whereby the operative can determine when the predetermined amount has been supplied to the inlet and then effect a closing of the valve ports 29, 30, 18. 37ᶜ indicates a bracket leading upwardly from the casing 28 for supporting the pipe 25 and meter 37.

In Figs. 1 to 7, inclusive, I have illustrated a freezing mechanism wherein the means and mechanism for supplying and charging the mix with the gas may be associated with a freezing chamber, its inlet and the operating devices for the mix supply through the inlet that is already built and in use for freezing materials, but it will be understood that such means and mechanism may be incorporated with the freezing cylinder, and its inlet, in the construction thereof, if desired. As illustrative of such form of construction, I have shown in Figs. 8 and 11, inclusive, a freezing mechanism wherein the rear end wall or head 3′ of the cylinder is provided with a gas inlet opening in close relation to the material inlet. In these views, the cylinder 1′ is provided with a front head 2′, forming with the head 3′ a freezing chamber. 4′ indicates the inlet. 5′ indicates the refrigerating means surrounding the cylinder 1′. 11′ indicates the agitating and ejecting mechanism operated by a suitable driving means 12′. 16′ indicates the support for cylinder 1′ and driving means 12′. 18′ indicates an outlet pipe leading from the batch tank 17′ and serving as fluid connection therefrom to the inlet 4′ which leads through the rear end or head 3′. All of the parts above referred to, except the head 3′, are or may be similar to like parts shown in Figs. 1 to 7, inclusive. In constructing the head 3′, it is formed with one or a plurality of openings 38 leading into the freezing chamber in relatively close relation to the discharge end of the inlet 4′. In the preferred form of construction, there are two openings 38 disposed at opposite sides to the inlet 4'. As shown, the wall of the head is constructed to form two ducts 39 leading from these openings 38 and a chamber 40 common thereto and to which they are connected at their upper ends. The chamber 40 is connected by a pipe 35' with the source of gas supply, such pipe being preferably connected to a casing 42, which is screw threaded into an opening 42'. The casing 42 is provided with a seat to receive a rotary plug or valve element $32^{a'}$ to control the flow of the gas to the chamber 40, ducts 39 and openings 38, and this valve element $32^{a'}$ or its shank is connected by an arm 34' to a link $34^{a'}$, which in turn is connected to the rod 24' which rotates the plug 21', whereby the valves for discharging the mix into the freezing chamber and for discharging the gas into the chamber 40 are opened simultaneously and closed simultaneously, in a manner similar to the valves 21 and $32^a$, referred to in connection with Figs. 1 to 7, inclusive. 37' indicates the meter connected in the pipe 35' and operating in the same manner as already set forth in connection with the meter 37. 36' indicates a pipe also connected with the chamber 40 and leading from a source of supply for a suitable cleansing medium. The connection of the pipe 36' with the walls of the chamber 40 and the valve $36^{a'}$ of the pipe are preferably similar to the connection for the pipe 35' and its valve $32^a$, except that the valve $36^{a'}$ is operated manually by a handle 43. In the operation of the freezing mechanism, the valve $36^{a'}$ is kept closed. In cleaning the chamber 40, ducts 39, and openings 38, the material inlet valve 21' and gas valve $32^{a'}$ are closed, then the valve $36^{a'}$ is opened. If desired the supply pipe 36' may be used to supply sufficient cleansing medium to wash the entire freezing chamber 1' and the mechanisms therein.

Figs. 12 to 16, inclusive, show a freezing mechanism of slightly different form, wherein the freezing cylinder $1^x$ is arranged in an upright position on a suitable support. In these views, the cylinder has a bottom $2^x$ and a top end or head $3^x$, the bottom having a discharge opening and a valve therefor, operated by a handle $2^{x'}$. $5^x$ indicates the refrigerating means surrounding the cylinder $1^x$ and having supply and discharge connections $7^x$, $8^x$, respectively, for the refrigerant, and a valve $10^x$ for controlling the supply thereof. $11^x$ indicates the agitating mechanism within the cylinder $1^x$, operated by a suitable driving means $12^x$. In this form of construction, the motor is preferably mounted on a separate support $12^{x'}$. $17^x$ indicates the batch tank connected by an inlet pipe $4^x$ with the interior of the cylinder $1^x$, as will later appear. The passage through the inlet pipe $4^x$ is controlled by a rotatable plug $21^x$, having a crank arm $23^x$, pivotally connected to one end of a link $24^x$. The other end of the link $24^x$ is pivotally connected to a lever $24^{x'}$, having a handle $24^{x2}$. The lever $24^{x'}$ is fulcrumed on the head $3^x$, its pivot rotatably fitting and extending through a hollow boss $3^{x'}$.

44 indicates a sleeve member preferably screw threaded into the walls of an opening $44^a$ formed in the head $3^x$. The upper end of the sleeve member is threaded, as shown at 45, and the body portion of the inlet pipe $4^x$ is screw-threaded therein to rigidly support the pipe in the sleeve member with its lower end in concentric relation thereto to form an annular space 46 or channel through which the gas flows for mixture with the materials flowing from the batch tank $17^x$ through the inlet $4^x$ into the cylinder $1^x$. Intermediate its ends the sleeve member is enlarged to form a chamber $46^a$ to admit gas to the space 46. Leading from the chamber $46^a$ is a nipple 47 to which is connected the gas supply pipe $35^x$, leading from the supply tank $26^x$. $32^{ax}$ indicates a valve interposed in the pipe $35^x$, the valve element thereof having a crank arm $34^x$ pivotally connected to one end of the link $34^{ax}$, the other end thereof being pivotally connected to the crank arm $23^x$; these connections being so arranged that when the lever $24^{x'}$ is operated the valves $21^x$, $32^{ax}$, will be simultaneously opened or closed.

$37^x$ indicates a meter connected in the pipe $35^x$ and arranged to measure the amount of gas admitted to the cylinder $1^x$ when the valves $21^x$, $32^{ax}$, are opened.

From the foregoing description it will be seen that the construction shown in Figs. 12 to 16, inclusive, and so far described, is similar to that shown in the remaining views except for modifications to adapt it to an upright type of freezing mechanism. However, in this form of construction I prefer to embody in it a further feature of construction, namely a connection between one of the elements of the devices for operating the valves $21^x$, $32^{ax}$, and a cap 47' or other form of valve that closes an opening 48 formed in the head $3^x$, whereby the cap may be operated from the position shown in Figs. 12, 13, 14 and 15 to the position shown in Fig. 16, when the valve $21^x$, $32^{ax}$, are operated to admit the materials and gas, thereby providing for the free escape of the air within the cylinder $1^x$. In the form of construction shown, the cap 47' is hinged at 49 and pivotally connected to a link 50, which in turn is connected by preference to the lever $24^{x'}$. Accordingly, when the lever $24^{x'}$ is operated in a clockwise direction (as viewed in Figs. 12, 14, 15 and 16) the valves $21^x$, $32^{ax}$ and cap 47' will be opened simultaneously, thereby admitting the predetermined quantities of material and gas and permitting them to force the air out of the cylinder through the opening 48. Operation of the lever in the opposite direction will close these parts.

In the carrying out of my process I first fill the batch tank with a predetermined quantity of material to be frozen (both valves for the material and gas being closed); open the valve to supply refrigerant to the refrigerating means; and set the agitating mechanism in operation. I then open the valves 21 and 32ª, allowing the material to flow into the cylinder and the gas to commingle or mix with the material as it flows therein; the meter indicating when the predetermined quantity of gas has been admitted; I then close the valves and continue the freezing operation until the material is frozen to the desired condition; whereupon it is discharged from the cylinder.

The operations of re-filling the cylinder with materials and gas, freezing the same and discharging the frozen mass may be continued as long as desired.

By reason of the fact that the inlet valves are connected for simultaneous or co-ordinated operation, the single operation of filling the freezing cylinder and cutting off the flow of the material so that the batch tank can be refilled enables the operative to charge the material with the gas without loss of time or extra labor or attention on his part.

In commercial types of freezing mechanisms the freezing cylinders are made to freeze predetermined quantities of materials in each operation. Accordingly, the discharge port for the gas or the valve in its supply pipe may be constructed to admit the desired quantity of gas according to the capacity of the cylinder and dependent upon the time it takes for such quantity to flow from the batch tank to the cylinder. Where this time varies because of the use of different materials, or for other reasons, certain of the elements connecting the valves or their connections with each other may be adjustable to compensate for such variation, so that the predetermined quantity of gas will flow to the cylinder in the time it takes for the material to flow thereinto.

As illustrative of one such adjustment, the arm 34 and link 34ª (Fig. 5), either or both, may be formed with a plurality of openings 52 to receive the pivot between these parts according to the adjustment required. A similar form of adjustment is shown in Figs. 8, 14 and 16. Likewise as shown in Fig. 16, the pivoted connections between the link 50 and lever 24ˣ' may be adjusted, the latter being formed with openings to permit of adjustment of the link 50 as well as the link 34ᵃˣ.

To those skilled in the art to which my invention relates many changes in construction and widely differing embodiments and applications of the invention will suggest themselves without departing from the spirit and scope thereof. My disclosures and the description herein are purely illustrative and are not intended to be in any sense limiting.

What I claim is:

1. The process of making ice cream and other frozen foods, which consists in placing pre-determined quantities of carbon dioxide gas or other inert gas, and the food or ice cream ingredients, into a freezing container at the same time, thereby displacing the air therefrom and then simultaneously refrigerating and agitating said gas and said food ingredients while in the container and thereby causing said food ingredients and said gas to commingle and become incorporated into a plastic or coherent condition as they pass from a liquid to a frozen state.

2. The method of making ice cream and the like which consists in introducing pre-determined quantities of carbon dioxide gas and the ice cream ingredients into a freezing chamber at the same time displacing air thereby and then agitating and freezing the same therein.

3. The process herein described of making ice cream which consists of charging the mix or ingredients with carbon dioxide gas by introducing pre-determined quantities of the gas and the mix ingredients into a freezing container at the same time, and displacing the contained air therefrom, and then simultaneously refrigerating and agitating said food ingredients and said carbondioxide gas while in the container thereby causing the inert gas and said food ingredients to commingle and become a coherent mass as they pass from a liquid to a frozen state.

4. The process of making ice cream and the like in a freezing chamber having agitating means operating therein which consists in introducing a pre-determined quantity of carbon dioxide gas and the ice cream ingredients into the freezing chamber at the same time and displacing the contained air therefrom, freezing and agitating the same therein.

5. The method of making ice cream or other frozen foods wherein a predetermined amount of the ice cream ingredients and a predetermined amount of carbon dioxide gas are put into the freezing cylinder or container at the same time through an opening so constructed that the ice cream ingredients and the carbon dioxide gas are thoroughly intermixed and the air contained in the cylinder or container is displaced therefrom as the intermixed ingredients pass into the container, and then agitating and freezing the same.

6. The method of making milk and cream products wherein a predetermined amount of milk and cream and a predetermined amount of carbon dioxide gas are put into a treating cylinder or receptacle at the same time through an opening so constructed that the milk and cream and the carbon dioxide gas become thoroughly intermixed and the air contained in the cylinder or receptacle is displaced therefrom as the intermixed ingredients pass into the treating receptacle or cylinder and then agitating and freezing the same.

7. In mechanism of the class described, the combination of a treating cylinder, agitating mechanism therein, means for supplying to said cylinder a pre-determined quantity of the material to be treated and a predetermined quantity of a gas and co-ordinated valve means for simultaneously introducing the material and gas to said cylinder or simultaneously cutting off such material and gas.

8. A mechanism as claimed in claim 7 in which the inlets for the material and gas into the cylinder are in associated relation.

9. In mechanism of the class described, the combination of a treating cylinder, agitating mechanism therein, means for supplying to said cylinders a predetermined quantity of material to be treated, means for supplying to said cylinder a pre-determined quantity of gas, valves for controlling the flow of the material and gas to the cylinder, connections between said valves whereby they are operated simultaneously in either direction, and means for operating said connections.

10. A mechanism as claimed in claim 9 in which means are provided for varying one of the supply means relative to the other.

11. In mechanism of the class described, the combination of a treating cylinder, agitating mechanism therein, a tank above the cylinder for holding a predetermined quantity of material to be treated, a conduit leading from the tank to the cylinder, a gas conduit leading from a source of supply to said cylinder, the inlet ends of said conduits being associated to effect mixture of the material and gas as they enter the cylinder, a valve in each of said conduits, said valves being connected together, whereby they are simultaneously operated to open position or closed position.

12. In mechanism of the class described, the combination of a treating cylinder having an inlet for the material, a gas conduit connected to said inlet for admitting gas thereto as the material flows through the inlet, valves for said inlet and conduit, and connections between said valves arranged to effect operation of the valves simultaneously to open position or closed position.

13. In mechanism of the class described, the combination of a treating cylinder having an inlet for the material, a chamber associated with said inlet and connected therewith by an inlet port, a valve for controlling said port, a valve in said inlet, and operating connections between said valves arranged to effect operation of the valves simultaneously to open position or closed position.

14. In mechanism of the class described, the combination of a stationary cylinder having heads at its ends, one of said heads being formed with an opening for material to be treated and openings for gas at either side of said material opening and ducts leading from said openings, respectively, a conduit leading from a source of supply for material connected to one of said ducts, a conduit leading from a source of supply for gas connected to the other of said ducts, valves in said ducts, and means for controlling said valves.

15. In mechanism of the class described, the combination of a treating cylinder having heads at its ends, one of said heads being formed with three associated openings and ducts leading upwardly therefrom, and provided with a chamber common to the ducts for the outer openings, a conduit for material connected to the duct for the intermediate opening, a conduit for gas connected to said chamber, and valves in said conduits.

16. In mechanism of the class described, the combination of a stationary cylinder having heads at its opposite ends, one of said heads being formed with associated openings for the material to be treated and an inert gas, a conduit leading from a source of supply for the material connected to one of said openings, a conduit leading from a source of supply of the gas connected to the other of said openings, valves in said conduits, and connections between said valves arranged to simultaneously effect opening thereof or closing thereof, said connections including adjustable means for varying the position of one valve relative to the other when operated to open position.

17. In mechanism of the class described, the combination of a treating cylinder, having heads at its ends, a shaft mounted axially of said cylinder and provided with an agitating mechanism, one of said heads being formed in its upper portion with a material inlet opening and gas and other inlet openings, one at either side of the material inlet opening, and means for supplying material to said material inlet opening and gas and other substance to said other openings.

18. A mechanism as claimed in claim 7 in which the treating cylinder is provided with a valved air outlet and said co-ordinated valve means is connected to the valve element for said outlet.

19. A mechanism as claimed in claim 9 in which the cylinder is formed with an air outlet, a valve is provided therefor and said valve is operatively connected to the connections for the controlling valves, whereby the air outlet valve is operated simultaneously therewith.

20. In mechanism of the class described, the combination of a treating cylinder, agitating mechanism therein, a material supply conduit connected to the cylinder, a gas supply conduit connected to the cylinder, an outlet conduit for air leading from said cylinder, a valve for each of said conduits, and means for simultaneously opening or closing said valves.

21. In mechanism of the class described, the combination of a treating cylinder having heads at its ends, one of said heads being formed with an opening, a sleeve member mounted in said opening, a conduit for material leading into said member with its lower end in concentric relation thereto to form an annular conduction space, and means for supplying gas to said annular space.

In testimony whereof, I have hereunto subscribed my name.

LEROY S. PFOUTS.